Figure 1:
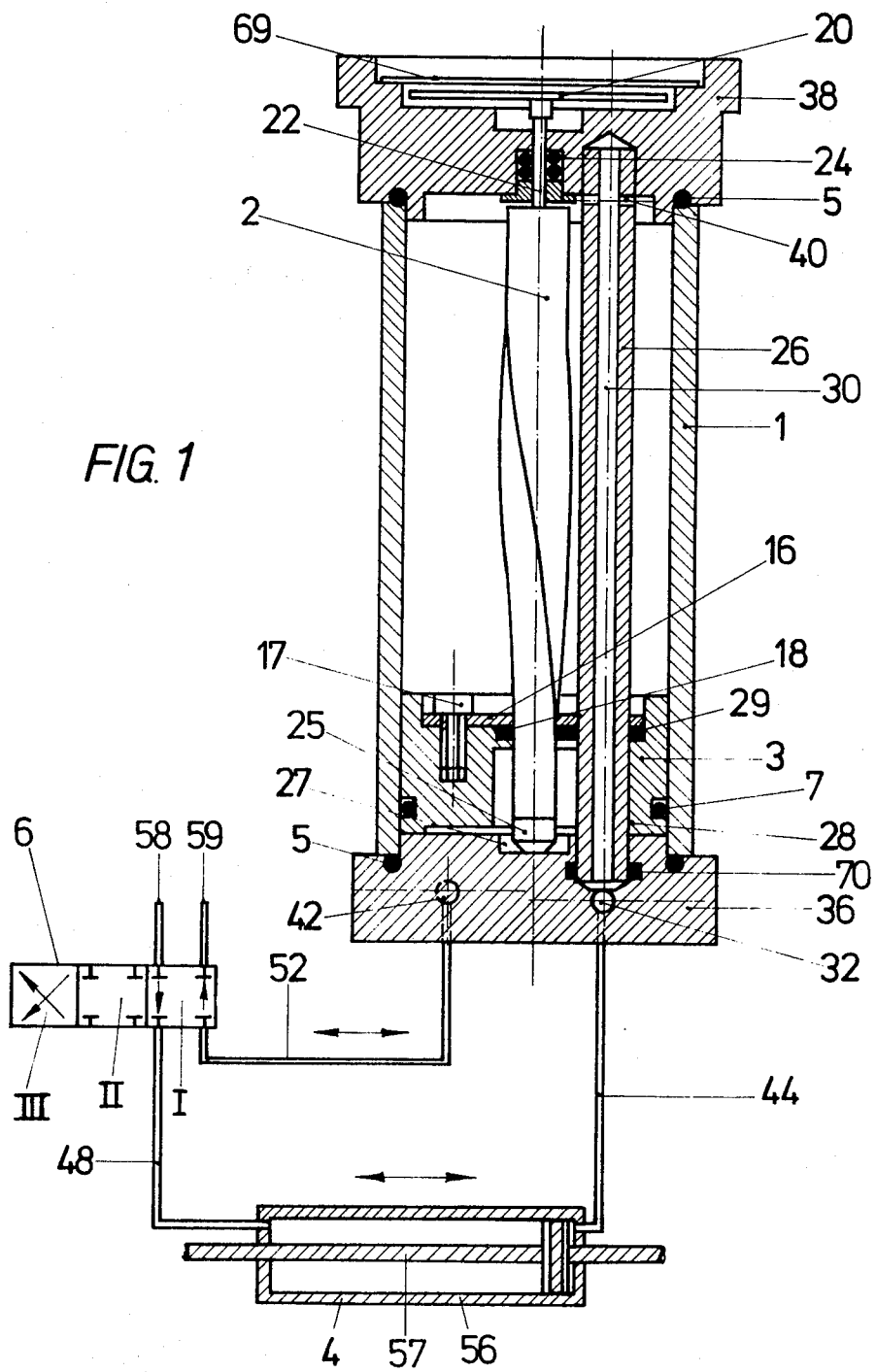

United States Patent
Aas et al.

[15] 3,654,891
[45] Apr. 11, 1972

[54] GAUGE CYLINDER ASSEMBLY FOR POSITION INDICATOR AND INDICATOR SYSTEM INCLUDING SUCH CYLINDER

[72] Inventors: Saebjorn Aas, Tynemouth, England; Kare Brathen, Rjukan, Norway

[73] Assignee: Norsk Hydro Verksteder A/S, Rjukan, Norway

[22] Filed: Dec. 29, 1969

[21] Appl. No.: 888,494

[30] Foreign Application Priority Data

Dec. 30, 1968 Norway ................................5235/68

[52] U.S. Cl. ................................116/124, 73/320, 73/419, 116/118, 137/553, 251/289
[51] Int. Cl. .................................................G09f 9/00
[58] Field of Search ...............116/118, 125; 73/389, 320, 73/419; 137/307, 139, 319, 553, 344; 251/289; 91/1

[56] References Cited

UNITED STATES PATENTS

| | | |
|---|---|---|
| 899,029 | 9/1908 | Connet ................................137/553 |
| 1,633,322 | 6/1927 | Gregory ................................73/320 |
| 1,643,753 | 6/1927 | Slattery ................................91/1 X |
| 2,574,262 | 11/1951 | Heck ................................137/139 |
| 3,156,255 | 11/1964 | Gasquet et al. ................................251/289 |
| 3,191,621 | 6/1965 | McKinnon et al. ................251/289 X |
| 3,439,706 | 4/1969 | Barrett ................................137/554 |

*Primary Examiner*—Louis J. Capozi
*Attorney*—Wenderoth, Lind & Ponack

[57] ABSTRACT

A volumetric gauge cylinder for a position indicator comprising a closed cylinder having connections for pressure fluid at its ends. A non-rotatable axially movable piston is capable of movement within the cylinder under the fluid pressure, and a rotatable spindle extends along the length of the cylinder and has a helical external configuration cooperating with, and forming a sealed fit with a correspondingly shaped opening in the piston so that linear movement of the piston is translated into rotary movement of the spindle. The spindle is operationally connected to an external indicator which is caused to rotate in accordance with movement of the spindle.

1 Claims, 4 Drawing Figures

Saebjorn Aas and
Kare Brathen.
INVENTORS

GAUGE CYLINDER ASSEMBLY FOR POSITION INDICATOR AND INDICATOR SYSTEM INCLUDING SUCH CYLINDER

This invention relates to position indicating systems of the kind including a volumetric gauge cylinder and is particularly concerned with the construction of a gauge cylinder used in such systems. Indicator systems of this kind are used in conjunction with hydraulic operating systems so as to provide an indication of the position of a movable mechanical element which is actuated by the hydraulic fluid of the system. Such systems are particularly suitable for use in indicating the position of remotely controlled hydraulically operated valves such as butterfly valves.

The gauge cylinder of such a system has a piston which is operated by the hydraulic fluid controlling the mechanical element and the position of this piston is thus used as an indication of the position of the element. For this purpose the piston is normally provided with a piston rod which extends out of the end of the cylinder so as to actuate an indicator device such as a pointer working over a scale. Owing to the risk of leakage of the hydraulic fluid along the piston rod at the point where the rod leaves the housing cylinder the cylinders need to be very robustly constructed and it is desirable to provide a construction in which the components can be made more simply and more cheaply.

According to the present invention a gauge cylinder of this same general type comprises a closed cylinder having connections for pressure fluid at its end, a non-rotatable piston which is capable of movement within the cylinder under the fluid pressure, a rotatable spindle extending along the length of the cylinder and having a helical external configuration cooperating with, and forming a sealed fit with a correspondingly shaped opening in the piston so that the linear movement of the piston is translated into rotary movement of the spindle and an external indicator which is caused to rotate in accordance with movement of the spindle. Since there is no need for a piston rod extending outside the cylinder itself the construction as a whole can be much simpler and cheaper. The external indicator may be driven by means of an extension of the spindle which is of reduced diameter and this presents much less difficulty in obtaining an effective seal. Alternatively the indicator can be driven by way of a magnetic coupling of which one part is connected to the indicator. The end of the cylinder then needs to be formed of non-magnetic material and under these circumstances no seal at all is required.

The spindle is preferably of rectangular cross-section but other shapes are also possible provided that the necessary helical configuration is achieved. This configuration is conveniently obtained in the case of a metal bar of rectangular cross-section merely by twisting. The spindle may be journaled at one end in one end of the cylinder and the other end may be supported so as to be capable of slight transverse movement. This prevents jamming of the piston if there is any small distortion of spindle since it enables the spindle to yield laterally as the piston moves.

Figure 3:
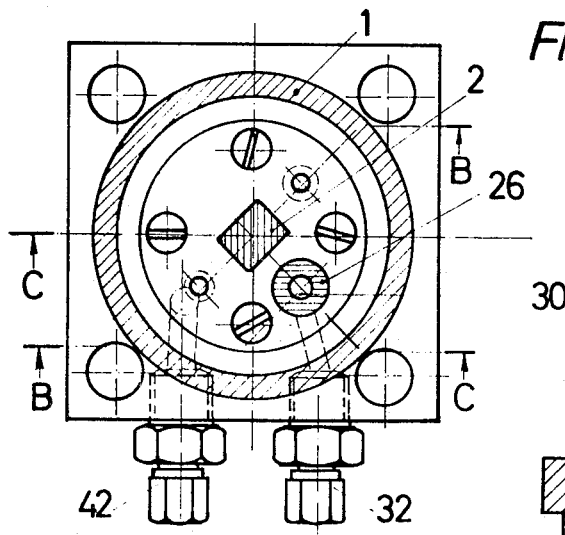
Figure 2:
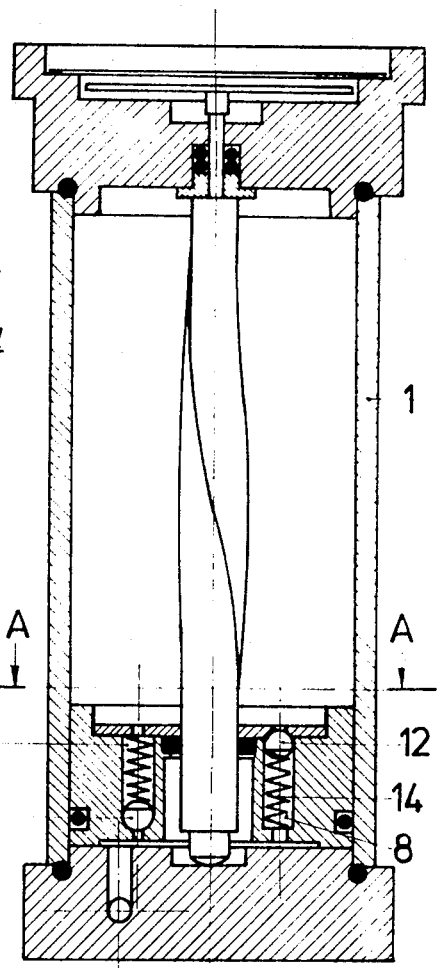
Figure 4:
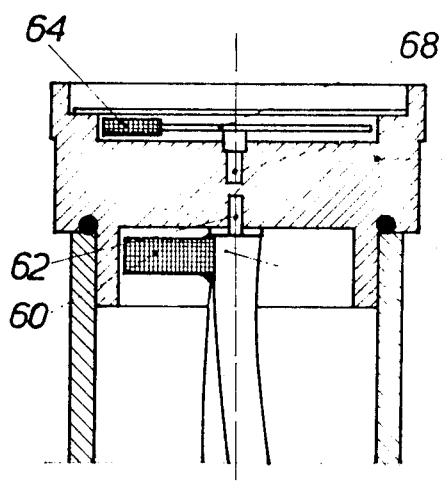

Constructions in accordance with the invention will now be described by way of example with reference to the accompanying drawings in which:

FIG. 1 is an axial section along the line C—C in FIG. 3 through a gauge cylinder, and also including a schematic view to a smaller scale of the remainder of the hydraulic system, FIG. 2 is an axial section along the line B—B in FIG. 3, FIG. 3 is a transverse section along the line A—A in FIG. 2, and FIG. 4 is a sectional view similar to the top portion of FIG. 2 of a modified form of construction.

Turning first to FIG. 1 the gauge cylinder is shown as 1 and is connected in series with a double acting hydraulic cylinder 4 and a valve 6 operated by this cylinder. Since the hydraulic cylinder itself is of a known type it is shown to a reduced scale but in practice it will have exactly the same volume as the gauge cylinder.

The gauge cylinder 1 encloses a piston 3 having sealing rings 7 engaging the cylinder wall and formed with apertures containing two spring biased relief valves 8 and 10. These valves are of the ball type having balls 12 biased by means of helical springs 14 so as to permit fluid flow in one direction or the other when the pressure across the piston exceeds a predetermined value.

The piston 3 cooperates with a spindle 2 formed from a bar of rectangular cross section which has been twisted to form a helix with an angle about 360° between the ends of the spindle. The spindle 2 passes through a corresponding opening in the piston 3 with which it forms a sealing fit so as to prevent fluid passing from one side to the other of the piston. For this purpose a guide plate 16 attached to the piston by means of a screw 17 is formed with an aperture corresponding to the cross-sectional shape of the spindle and also retains a sealing member 18 which encircles the spindle 2.

At its upper end as seen in FIGS. 1 and 2 the spindle 2 is formed with an axial extension constituted by a relatively thin stem 22 extending through the end 38 of the cylinder via a combined thrust bearing and packing 24. On the outside of the cylinder the stem 22 is connected to an indicator for example, in the form of a pointer cooperating with a scale (not shown) so as to indicate the angular position of the spindle 2 and hence the axial position of the piston 3. The other end of the spindle 2 is supported in a recess 27 which has a somewhat larger diameter than the spindle so that the latter is capable of slight transverse movement. This permits the end 25 of the spindle 2 to "walk" in the recess 27 to allow for any slight distortions of the spindle 2.

The cylinder 1 also encloses a hollow guide rod 26 which extends through an aperture in the piston 3 defined by bushing 28 provided with a packing. The opposite ends of the rod 26 are seated in the ends 36 and 38 of the cylinder 1 and the hollow interior shown as 30 communicates at the lower end with a port 32 for pressure fluid. At the other end an opening 40 forms a port from the passage 30 communicating with a recess 37 in the cylinder end 38. The rod 26 serves both as guide for the piston 3 which prevents rotation of the piston and also a fluid connection for the pressure fluid between the inlet 32 and the opposite end of the cylinder 1. In this way both the connection 32 and a second connection 42 for the pressure fluid may be located at the same end of the cylinder 1 thus facilitating the construction and the mounting of the cylinder.

The connection 32 leads to a pipe 44 connected at one end of the cylinder 4 which has a piston 56 and a double piston rod 57. The piston 56 is connected to the valve or other mechanical element of which the position is to be indicated. The other end of the cylinder 4 is connected by way of a pipe 48 to a control valve 50 which in its turn is connected to a source of pressure fluid by pipes 58 and 59. From this valve a further pipe 52 extends to the second connection point 42 of the cylinder 1. The control valve 6 is a manually operated four-way valve having three positions.

The operation of the system is as follows. Axial movement of the piston 3 within the cylinder 1 under the control of fluid pressure in either direction produces a rotary motion on the spindle 2 since the piston 3 is prevented from rotating by the rod 26. In the position shown in FIG. 1 pressure fluid from the valve 6 has moved the piston 56 of the cylinder 4 to the right-hand end of this cylinder. The pressure fluid which was previously located at the right-hand side of the piston 56 has been forced along the pipe 44 through the connection 32 and thence through the passage 30 and out through the port 40 into the upper part of the cylinder 1. This has forced the piston 3 downwardly to its lowest position as shown in FIG. 1 thus resulting in a corresponding turning movement of the spindle 2.

Owing to the fact that the volumes of the cylinders 1 and 4 are the same movements of the piston 56 from one end to the other of its cylinder 4 will result in synchronous movements of the piston 3 from one end to the other of its cylinder 1 with corresponding movement of the pointer 20 so that the latter will at any time indicate the position of the piston 56 and hence the position of the valve or other mechanical element controlled by the piston rod 57.

When the control valve 6 is moved so as to reverse the direction of flow movement will take place in the opposite direction to that just described. The pressure fluid will then flow directly into the cylinder 1 through the pipes 59 and 52 and lift the piston 3 to its opposite end position and at the same time the pressure fluid on the upper side of the piston 3 will be forced out through the tube 44 so as to move the piston 56 of the working cylinder 4 to its other extreme position. During this movement the pointer 20 will indicate the position of the piston 57 at any time. If it is desired to lock the piston 57 in an intermediate position the control valve 6 is placed in an intermediate position in which both pipes 48 and 52 will be closed. This prevents the flow of pressure medium and both pistons will be locked in corresponding positions in the respective cylinders.

The system is designed so that if a minor leakage should occur, for instance a leakage of pressure fluid from one side to the other of one of the pistons, both pistons may nevertheless be moved to the respective end positions so that the system is self-adjusting. This is accomplished by the provision of the reflief valves 8 and 10 in the piston 3. If, for example, the piston 56 has not reached one of its end positions although the indicator shows this position and the piston 3 has reached the end position, further movement of the piston 56 will lead to an increase in the pressure on the operating side of the piston 3. Since this piston cannot move any further the result will be that one relief valve will be opened and will remain open until sufficient pressure fluid has flowed through the valve to enable the piston 56 to reach its end position. In other words this movement of the piston 56 will not be accompanied by corresponding movement of the spindle 2 and pointer 20 and the error will thus be removed so that the system is self-adjusting. The valves 8 and 10 also serve an important function when starting up the hydraulic system since the valves will then serve as bleed valves and ensure that the system is completely filled with pressure fluid thus eliminating air or gas pockets.

The modified construction shown in FIG. 4 completely eliminates any mechanical transmission through the end of the cylinder 1. In this modification the stem 22 is replaced by a magnetic coupling of which one part 60 is connected to the end of the spindle shown as 2a which is journaled in the end 38a of the cylinder by means of a pin 62. In this modification the end 38a is made of non-magnetic material such as stainless steel, aluminum or plastics such as nylon or plexiglass. The other part 64 of the magnetic coupling is journaled on a small shaft 66 which carries the pointer shown as 68. Rotary movements of the spindle 2a are thus transmitted through the parts 60 and 64 of the magnetic coupling to the pointer 68.

In both forms of construction illustrated various modifications are possible; for example, the guide rod 26 is not essential and rotation of the piston 3 may be prevented, for example, by the provision of splines engaging complementary grooves in the cylinder wall. The translation of the axial movement of the piston 3 into rotary movement of the spindle 2 is of substantial advantage in avoiding the need to extend a reciprocating member through the end of the cylinder. An indicating system in accordance with the invention can be arranged in several ways. It is generally desirable for the cylinder 4 to be remotely controlled, for example, when used in connection with valves on ships. With such an installation the gauge cylinder 1 is usually installed at the control station so that the position of the remote valve can be checked at any time. In some cases, however, in order to avoid the need for long runs of piping for the gauge cylinder and the reading of the indicator may then be transmitted to the control station by means of an electrically operated repeater.

What is claimed is:

1. A volumetric gauge cylinder for a position indicator comprising a closed cylinder having connections for pressure fluid at its ends, a non-rotatable piston movable within said cylinder under the fluid pressure, a rotatable spindle extending along the length of said cylinder having a helical external configuration cooperating with, and forming a sealed fit with a correspondingly shaped opening in said piston so that linear movement of said piston is translated into rotary movement of said spindle, an external indicator rotating in accordance with the movement of said spindle, said piston including a pair of oppositely connected, spring-loaded pressure relief valves which remain closed during normal operation but open to permit the flow of pressure fluid if the pressure exceeds a predetermined value when said piston reaches either end of its stroke, a hollow guide rod for said piston having a sealing fit with an opening in said piston extending between the two ends of said cylinder at one of which its interior communicates with an external connection for pressure fluid and at the other of which its interior communicates with the interior of said cylinder to form the pressure fluid connection at that end.

* * * * *